United States Patent [19]

Clemens

[11] Patent Number: 4,573,370

[45] Date of Patent: Mar. 4, 1986

[54] GEAR REVERSING MECHANISM FOR POWER TOOLS

[75] Inventor: Donald W. Clemens, Painesville, Ohio

[73] Assignee: The Rotor Tool Company, Cleveland, Ohio

[21] Appl. No.: 567,418

[22] Filed: Dec. 30, 1983

Related U.S. Application Data

[63] Continuation-in-part of Ser. No. 512,164, Jul. 8, 1983, abandoned.

[51] Int. Cl.[4] .......................... F16H 5/06; F16H 3/22; E21B 3/00
[52] U.S. Cl. .................................. 74/337.5; 173/163; 418/270; 74/343
[58] Field of Search ............... 81/57.31; 173/163, 106, 173/107; 418/270; 415/503; 91/220; 74/342, 343, 337.5, 527

[56] References Cited

U.S. PATENT DOCUMENTS

| | | | |
|---|---|---|---|
| 1,581,927 | 4/1926 | Kollock | 74/343 X |
| 1,889,909 | 12/1932 | Upton | 74/337.5 X |
| 2,845,806 | 8/1958 | Miller | 74/343 |
| 2,905,149 | 9/1959 | Swanson | 91/220 X |
| 3,257,877 | 6/1966 | Ulrich et al. | 173/163 X |
| 3,457,801 | 7/1969 | Meldrum | 74/527 |
| 3,712,386 | 1/1973 | Peters | 415/503 X |
| 3,752,241 | 8/1973 | Bent | 415/503 X |
| 3,901,631 | 8/1975 | Wickham et al. | 418/270 X |
| 3,942,392 | 3/1976 | Page, Jr. et al. | 415/503 X |
| 3,988,076 | 10/1976 | Wolf et al. | 418/270 X |
| 4,040,311 | 8/1977 | Page, Jr. et al. | 415/503 X |
| 4,155,278 | 5/1979 | Estok | 81/57.31 X |
| 4,187,063 | 2/1980 | Yoshida et al. | 418/270 X |
| 4,274,304 | 6/1981 | Curtiss | 173/163 X |
| 4,344,746 | 8/1982 | Leonard | 418/270 |
| 4,364,286 | 12/1982 | Ciolle | 74/788 X |
| 4,366,871 | 1/1983 | Dieterle et al. | 81/57.31 X |
| 4,462,282 | 1/1984 | Biek | 81/57.31 X |

FOREIGN PATENT DOCUMENTS

| | | | |
|---|---|---|---|
| 1280632 | 10/1968 | Fed. Rep. of Germany | 74/342 |
| 1126005 | 11/1956 | France | 74/343 |
| 0034905 | 4/1981 | Japan | 418/270 |

Primary Examiner—Leslie A. Braun
Assistant Examiner—D. Wright
Attorney, Agent, or Firm—Renner, Otto, Boisselle & Lyon

[57] ABSTRACT

A gear reversal mechanism for a hand held power tool is selectively operative to reverse the output of a unidirectional motor and provides a direct drive forward mode and an indirect drive reverse mode, with the selection therebetween being implemented by a manual shift collar operating a cam mechanism selectively to reorient the gear train and consequent direction of motor output. The shift collar is temporarily locked to the gear housing during tool operation by using the operative air pressure of the tool to expand a locking mechanism into locking engagement with such shift collar. With or without the locking mechanism, an exhaust shutoff shift interlock may be provided to permit exhaust air to exit the housing when the shift collar is in either its forward or reverse operating positions or alternatively to close the housing exhaust ports to block exhaust air flow to preclude motor operation when the shift collar is between its operating positions.

22 Claims, 12 Drawing Figures

GEAR REVERSING MECHANISM FOR POWER TOOLS

CROSS REFERENCE TO RELATED APPLICATION

This application is a continuation-in-part application of my application Ser. No. 512,164 filed on July 8, 1983, now abandoned.

BACKGROUND OF THE INVENTION

1. Field of Invention

The present invention relates as indicated to a reversing mechanism for use with handheld power tools in general and to an in line reversing gear mechanism for use with such power tools in particular.

2. Summary of Prior Art

In air power tools, the means most commonly relied upon to provide bidirectional or reversible rotation in a vane motor having two air inlet ports symetrically disposed in opposite halves of the vane motor chamber and a common exhaust port positioned midway between the inlet ports. Air entering one inlet port and exiting through the common exhaust port causes the air motor to rotate in one direction, whereas air entering the other inlet port and exiting the common exhaust port causes rotation of the motor in the opposite direction. This type of reversing air motor has several disadvantages. First, the air tool must include the valving necessary to alternately direct the pressurized air to one or the other of the two inlet ports. Second, the air must enter and exit the vane motor in something less than 180° of movement. The expansive force and thus the power produced by the air motor is less than that which can be produced in a conventional single direction air motor wherein the radial separation of the inlet and outlet ports allows the effective utilization of the expansive power of the air over approximately 240°. Thus, the output power of the tool must be compromised if a bidirectional air motor is to be utilized.

To avoid a bidirectional motor with the consequential loss of power, separate reversing mechanisms may be incorporated into a tool having a unidirectional motor. Examples of two different types of reversing mechanisms for this purpose are shown in Curtiss U.S. Pat. No. 4,274,304 and Ciolli U.S. Pat. No. 4,364,286, which patents are commonly assigned with the present application. These reversing mechanism are operationally satisfactory but include relatively complicated structure adding to manufacturing and assembling costs.

SUMMARY OF THE INVENTION

The present invention comprises an in-line reversing mechanism for use with air powered, hand tools having a unidirectional motor. The reversing gear mechanism is relatively simple in construction and provides direct drive between the rotor and output for normal tool operation with no load on the gearing. The direction can be reversed by manually moving a shift collar to reorient the drive train to indirectly drive the output through the reverse gearing mechanism. Utilization of the gearing for reversing the output results in a higher torque and lower rpm reverse output, which may be helpful in removing seized or cross threaded fasteners.

The shift collar of the present invention is temporarily locked to the housing in one of its two positions during operation of the tool. The temporary locking is provided by a flexible diaphragm mounted to the housing which carries a locking pin selectively received in retention means on the shift collar when the diaphragm is expanded radially outwardly. This expansion of the diaphragm is preferably achieved by the exhaust air from the air motor being passed through the gear housing. This flow path for the exhaust air has a lubricating effect on the gearing, increases the flow path length for the exhaust air to muffle tool noise and provides a temporary lock between the housing and the shift collar during motor operation. This positive retention of the shift collar prevents the operator from inadvertently reversing the tool during operation, which potentially could have a detrimental effect on the gearing.

Alternatively, an interlock may be provided to permit the tool motor to operate only when the shift color is in its forward or reverse operating positions. Such interlock includes a ported shut off collar which rotates with the shift collar. In the forward and reverse positions of the shift collar, ports in the shut off collar are in alignment with exhaust ports in the gear housing to permit exhaust air to exit the gear housing. When the shift collar is in a neutral mode between the forward or reverse positions, the shut off collar ports are not longer in alignment with the housing exhaust ports, and the shut off collar then blocks the housing exhaust ports to preclude air exhaust and thus motor operation.

In view of the above, it is the principal object of this invention to provide an in-line motor gear reversal mechanism of relatively simple construction for use with power hand tools.

It is a further object of this invention to provide such a motor gear reversing mechanism which can be retrofit in existing pneumatic tools which are separable between the motor housing and drive head or motor housing and speed reduction housing.

It is still a further object of this invention to provide a motor gear reversal mechanism which is relatively simple in construction, is compact and lightweight and is easily manufactured, assembled and installed. The simple, lightweight construction of the gear reversal mechanism provides low inertia characteristics to minimize any effect on torque accuracy, thereby to permit this gear reversal mechanism to be employed in tools used for precise tightening applications.

It is also an object of the present invention to provide an in-line motor gear reversal mechanism having a direct drive forward mode which does not alter the forward drive gear ratio.

It is still another object of this invention to provide such a gear reversing mechanism having direction selection structure which is easily operable and which is automatically locked in position during motor operation.

It is yet another object of the present invention to provide an exhaust shut-off shift interlock which permits the tool to operate only when the shift collar is in either its forward or reverse operating position.

These and other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

DESCRIPTION OF THE PREFERRED EMBODIMENT

Figure 1:
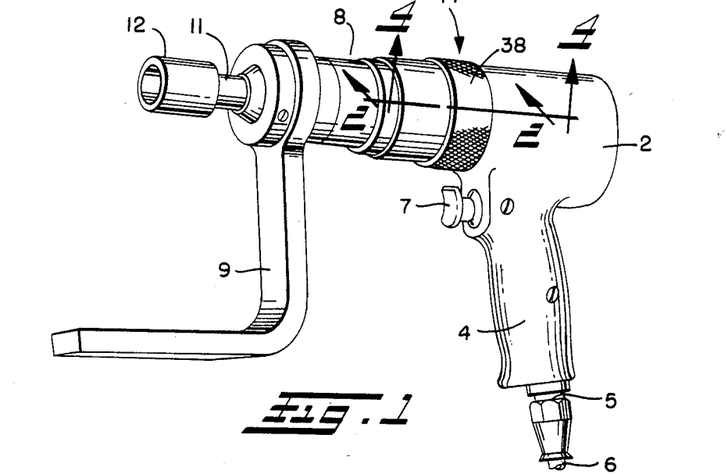
FIG. 1 is a perspective of a hand-held power tool incorporating the motor gear reversal mechanism of the present invention.

Turning now in more detail to the invention and initially to FIG. 1, a pneumatically powered hand-held tool, such as the nutrunner shown, is indicated generally at 1. The nutrunner 1 includes a housing 2 which encloses and protects a unidirectional air motor 3. The housing 2 includes a handgrip 4 having an inlet fitting 5 coupled to a hose 6 supplying compressed air to the motor. A pushbutton trigger or switch 7 is provided at the top of handgrip 4 for easy manipulation by the user. When the trigger 7 is depressed, a valve (not shown) to which the trigger is connected opens and allows compressed air to enter the air motor and cause the same to rotate.

The nutrunner 1 may further include a gear type speed reducer enclosed in a speed reduction housing 8.

At the forward end of the speed reduction housing, a reaction bar 9 may be selectively rotatably attached to said housing for bracing against convenient adjacent structure to transfer the reaction torque to such structure rather than to the operator. An output shaft 11 extends from the forward extremity of the speed reducer housing 8 and has a socket 12 interchangably mounted on its forward end. Such socket typically consists of a six or twelve sided fitting to receive and engage the nut or fastener to be tightened. The output shaft 11 and socket 12 mounted thereon may be driven in a forward or reverse mode, with the drive direction being selectively implemented by the gear reversal mechanism of the present invention. The gear reversal mechanism, indicated generally at 14, is positioned between the air motor housing 2 and the speed reduction housing 8.

Figure 2:
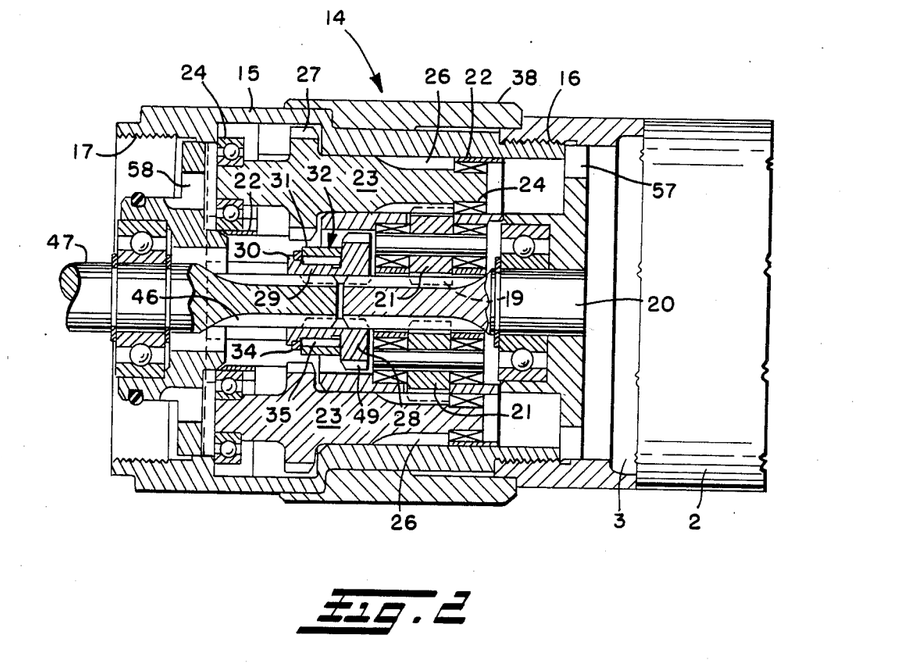
FIG. 2 is a partial vertical section of the gear reversal mechanism taken along the plane 2—2 in FIG. 1, with the reversal mechanism being shown in the direct forward drive mode.
Figure 3:
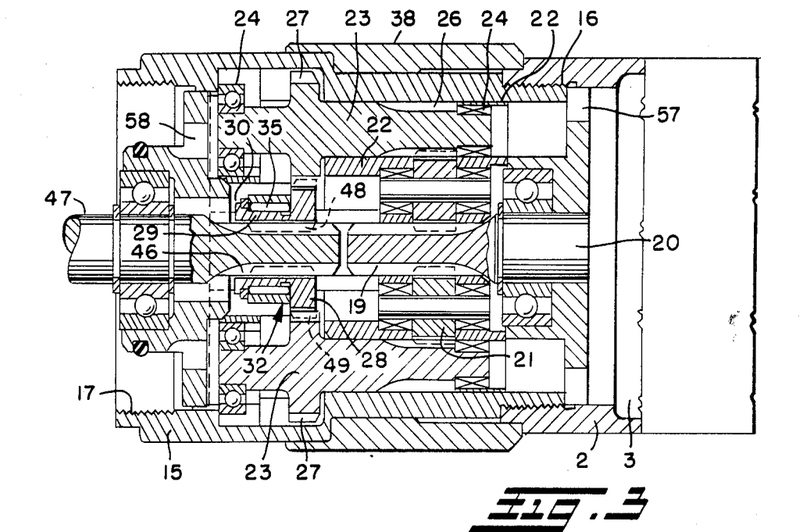
FIG. 3 is a partial vertical section of the gear reversal mechanism similar to FIG. 2 but showing the same in the indirect, reverse drive mode.
Figure 4:
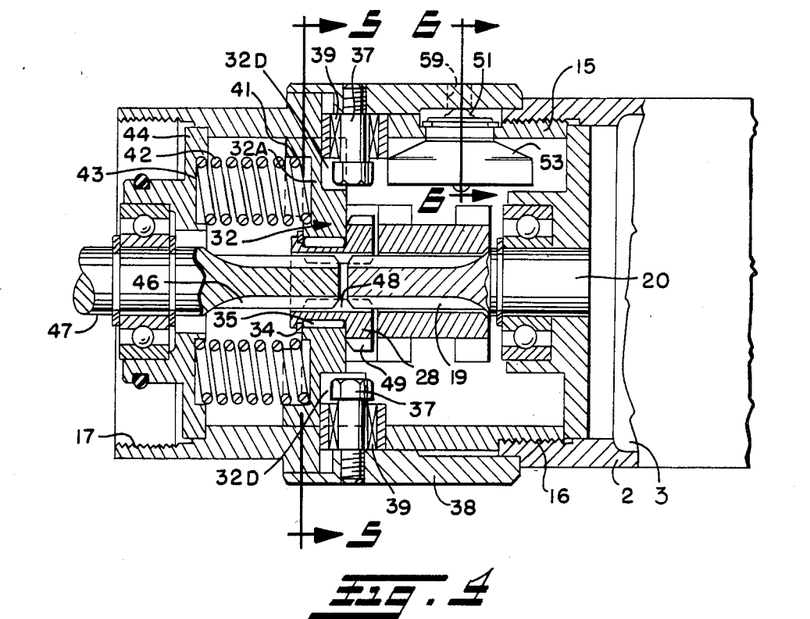
FIG. 4 is a partial horizontal section of the gear reversal mechanism taken generally along the plane 4—4 in FIG. 1.

As best shown in FIGS. 2-4, the gear reversal mechanism 14 is enclosed and protected by a stepped generally cylindrical housing 15. The end of housing 15 adjacent motor housing 2 has male threads 16 thereon which mate with female threads on motor housing 2 to removably connect the gear reversal mechanism to the motor housing. The other end of housing 15 has female threads 17 thereon which mate with complimentary male threads on the speed reduction housing or drive output to provide a removable connection therebetween. With the noted threaded connections, the gear reversal mechanism 14 of the present invention can be retrofit to existing air tools by unthreading the speed reduction housing from the motor housing and inserting the motor gear reversal mechanism therebetween. This reversal mechanism cooperates with a rotor pinion either to directly drive the same in the forward mode or to indirectly drive the same in a reverse mode.

Figure 7:
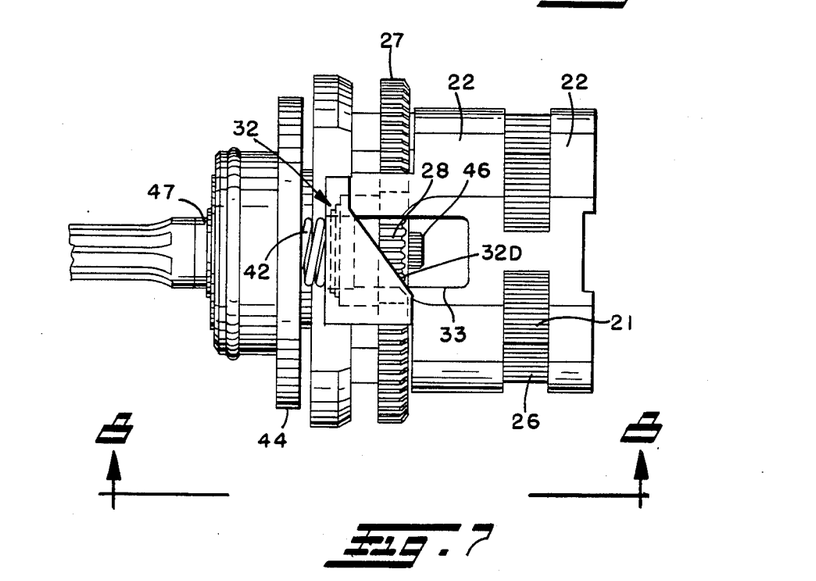
FIG. 7 is an elevation of the gear reversal mechanism removed from the gear housing for clarity of illustration.
Figure 8:
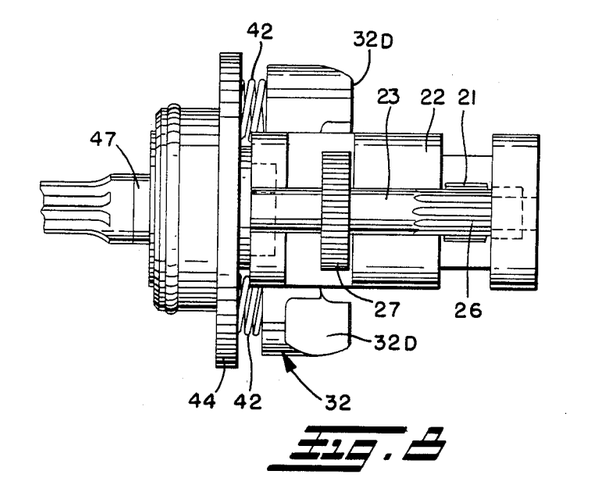
FIG. 8 is a bottom plan view of the motor gear reversal mechanism taken generally along the plane 8—8 in FIG. 7.

To this end, the rotor pinion 19 is on the forward end of the motor output shaft 20, which is driven in a clockwise direction only by air motor 3, as viewed from the motor end of the tool. The rotor pinion 19 is in mesh with the respective teeth on two opposed idler gears 21. These idler gears are rotatably mounted in a carrier body 22. As best shown in FIGS. 7 and 8, the carrier body 22 is a one piece casting preferrably of anodized aluminum having a spider-like configuration centrally to receive the input and output shafts and rotatably to mount the idler gears 21 and the transfer gears in mesh therewith.

As best shown in FIGS. 2 and 3, two diametrically opposed transfer gears 23 have elongated, axially oriented bodies rotatably mounted at their respective ends by bearings 24 in carrier 22. Each of the elongated transfer gears 23 has a transfer pinion 26 on its end adjacent the motor housing and a spur gear 27 adjacent its other or forward end. The transfer pinions 26 on transfer gears 23 are respectively in mesh with idler gears 21, and thus the transfer gears 23 are rotatably driven whenever the motor is operating to rotate the rotor pinion and idler gears in mesh therewith. The spur gears 27 on transfer gears 23 have a larger diameter than the respective bodies of transfer gears 23 and selectively cooperate with primary drive gear 28 in one of its two operative axial positions.

The primary drive gear 28 has an integral forwardly extending sleeve 29 thereon with an annular lip 30 at its front end. The sleeve 29 is rotatably received in an aperture 31 in the hub of shift body 32. A ring 34 is press fit against lip 30 on the primary drive gear to mount the primary drive gear to the shift body 32 for axial movement therewith, with the primary drive gear 28 being mounted by bearings 35 for rotation relative to the shift body 32.

Figures 5, 6:
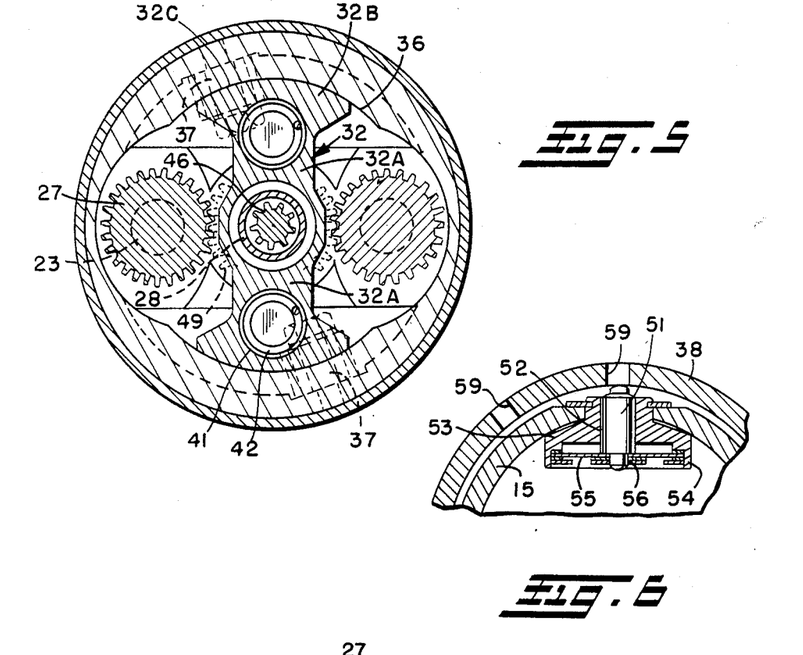
FIG. 5 is an end section of the motor gear reversal mechanism taken along the plane 5—5 of FIG. 4.
FIG. 6 is a partial section of the locking means for the shift collar of the gear reversal mechanism taken along the plane 6—6 in FIG. 4.

As best shown in FIG. 5, the shift body 32 has two radially outwardly extending arms 32A terminating in locator flanges 32B. The respective outer ends of flanges 32B have arcuately configured surfaces 32C which are received in diametrically opposed arcuate grooves 36 in gear housing 15. The cooperating arcuate surfaces 32C of the shift body flanges 32B and gear housing grooves 36 locate the shift body concentrically relative to the gear housing but permit axial movement of the shift body relative to the gear housing. As best shown in FIG. 7, the slots 33 in the sides of the carrier 22 slidingly receive the shift body arms 32A passing therethrough to prevent the shift body from rotating relative to the gear housing during its axial movement relative thereto. The shift body 32 and primary drive gear carried thereby are free to move axially because the shift body is oriented between and 90° from the transfer gears 23 as best shown in FIG. 5. The axial movement of the shift body and primary drive gear carried thereby is controlled by a selectively manually actuated camming mechanism.

To this end, the shift body 32 has a camming ramp 32D on the backside of each arm and flange projection. The relative slopes of the two camming ramps 32D are best shown in FIGS. 7 and 8. The two ramps 32D respectively have cam members 37 in sliding contact therewith. The cam members 37 are mounted on and project radially inwardly from a rotatable shift collar 38. As best shown in FIG. 4, two diagonally opposed circumferentially elongated slots 39 are provided in gear housing 15 to permit the two cam members 37 to move circumferentially upon rotation of the shift collar 38 to the circumferential extent of the slots 39. Selective rotation of the shift collar 38 in a counterclockwise direction will move the cam members 39 along the ramps 32D on shift body 32, with the slope of such ramps being oriented to result in such shift body being cammed axially to the left by cams 37. The axial movement of the shift body simultaneously moves the primary drive gear axially to the left because of its rotatable mount in such shift body.

The two arms 32A of the shift body are respectively provided with pockets 41 to receive and retain the rear ends of springs 42. The forward ends of springs 42 are received in pockets 43 in a forward end wall 44 secured to housing 15. The springs 42 normally urge the shift body 32 to the right as viewed in FIGS. 2 through 4 to maintain the ramps 32D in contact with the cams 37. Thus, when the shift collar and cams are rotated in the opposite or clockwise direction, the ramp means 32D follow the cams 37 under the bias of springs 42, whereby the shift body returns to its first axial position under spring bias and under control of said cams.

In the first axial position of the primary drive gear as illustrated in FIGS. 2 and 4, the rotor splines is directly coupled to the output pinion 46 on output shaft 47. This direct drive coupling by the primary drive gear 28 is provided by the splined bore 48 in such primary drive gear 28. Such splined bore is of sufficient axial extent to span the rotor pinion 19 and output splines 46 and has its splines in driving connection with the input pinion and output splines as shown in FIGS. 2 and 4. Thus when the rotor pinion is rotated in a clockwise direction by the air motor 3, the output splines 46 and output shaft 7 are rotated in a clockwise direction by the direct drive connection therebetween provided by the splined bore 48 in primary drive gear 28. In such direct drive position of the primary drive gear, identified herein as its drive position or first axial position, the circumferential teeth 49 on primary drive gear 28 are freely rotating and do not engage the teeth on spur gears 27 of transfer gears 23. These transfer gears 23 are being rotated by the idler gears 21 in mesh with the rotor pinion 19, but the spur gears 27 are not in driving engagement and thus are freely rotating.

When the operator wants to reverse the output direction, the shift collar is rotated in a counterclockwise direction to move the cams 37 along the ramps 32D of shift body 32 to drive such shift body to the left against the bias of springs 42. This axial movement of the shift body results in the primary drive gear being moved to its second axial position. In such second or reversal position, the circumferential teeth 49 on primary drive gear 28 are in mesh with the respective teeth on the two opposed spur gears 27 on the two transfer gears 23. In such reversal position, the splined bore 48 of the primary drive gear has cleared the rotor pinion and no longer extends between the rotor pinion and the output splines on output shaft 47. Instead, as shown in FIG. 3, the splined bore 48 of the primary drive gear 28 is exclusively in driving contact with the output splines 46 on output shaft 47.

Thus, when the primary drive gear is in its second or reversal position, rotation of rotor pinion 19 in its clockwise direction will result in the idler gears 21 rotating in a counter clockwise direction, the transfer gears 23 rotating in a clockwise direction and the primary gear rotating in a counter clockwise direction, thereby to drive the output splines and output shaft in a counter clockwise direction. Therefore, the direction of rotation is reversed by the idler gears, transfer gears and primary drive gear when the primary drive gear has been shifted to its second axial position. This reversed output through the gear train results in a higher torque and lower rpm being applied to the output shaft, which is sometimes helpful in removing fasteners that are seized or cross threaded.

To return the tool to its normal driving mode, the operator merely rotates the collar in a clockwise direction with the shift body returning to its first axial position under the bias of springs 42 as described in detail above. This first direct drive position of the primary drive gear eliminates any loading on the idler and transfer gearing during normal operation of the tool. Moreover, the tool is designed so that the operator knows that clockwise rotation of the collar to the extent circumferentially permitted by the slots 39 in housing 15 will result in clockwise rotation of the output shaft and vice versa. The shift collar 38 is locked in its selected position during operation of the tool to preclude inadvertent reversal, thereby to minimize the possibility of damage to the gears.

To this end, as best shown in FIGS. 4 and 6, a locking mechanism is provided between the gear housing 15 and the shift collar 38. This locking mechanism includes a radially extendable and retractable pin 51 which is slidably mounted in a bore 52 in lock body 53 secured to housing 15. The lock body 53 has a skirt 54 on its radially inner end which has a diaphragm 55 connected to and extending across its inner circumferential surface. This diaphragm 55 has the radially inner end of pin 51 secured thereto as indicated at 56. The diaphragm 55 moves radially inwardly and outwardly under air pressure.

In this regard, exhaust air from air motor 3 is preferably passed through ports 57 in motor housing 2 into the gear housing 15. Therefore, when the air motor is operating, the exhaust air is moving through the gear housing and then exits through output ports 58. This exhaust air movement through gear housing 15 has a lubricating effect on the gearing, lengthens the exhaust path to muffle tool noise and increases the air pressure in the gear housing 15 to force the diaphragm radially outwardly. This radially outwardly directed movement of the diaphragm 55 moves the pin 51 radially outwardly. The pin 51 when radially extended is received in one of the two retention means in shift collar 38.

As shown in FIG. 6, the two circumferentially spaced retention means are preferably apertures 59 in the shift collar 38 alternately to receive the outer end of pin 51 when in radial alignment therewith. The circumferential spacing of the aperatures 59 coincides with the circumferential spacing of the ends of the two elongated slots 39 in which the cams 37 slide. Thus, when the shift collar 38 is at its two extremes of rotational movement, one of the two retention apertures 59 is in direct radial alignment with the pin 51. Thereafter, during motor operation, the diaphragm 55 expands radially to advance pin 51 into aperture 59 to provide a temporary lock therebetween to secure the shift collar 38 to the housing 15. When tool operation is discontinued, the diaphragm contracts to remove the pin 51 from the aperture 59 in radial alignment therewith to permit the operator to rotate the shift collar to change the output direction if desired.

During this shift collar rotation between the forward and reverse positions, the primary drive gear 28 is in transitory movement and thus does not have full tooth engagement with either spur gear 27 or rotor pinion 19. Inadvertent operation of the tool in the transitory or neutral mode of the shift collar may unduly load and therefore damage the gear reverse mechanism. To avoid such inadvertent operation, the tool is preferably provided with an exhaust shut-off shift interlock, indicated generally at 61 in FIGS. 9-12. The shut-off interlock 61 may be used in addition to the diaphragm locking means or may be used by itself in the preferred mode to keep the gear housing relatively small.

The shift interlock 61 includes a cylindrical shut off collar 62 nested in and concentric with the shift collar 38. The shanks of cam members 37 couple the shift collar 38 to the shut off collar 62, whereby the shut off collar rotates with the shift collar. The shut off collar 62 has a plurality of circumferentially spaced ports 63 through its cylindrical wall. These ports 63 are preferably spaced at approximately 40° circumferential intervals.

Figures 9, 10, 11, 12:
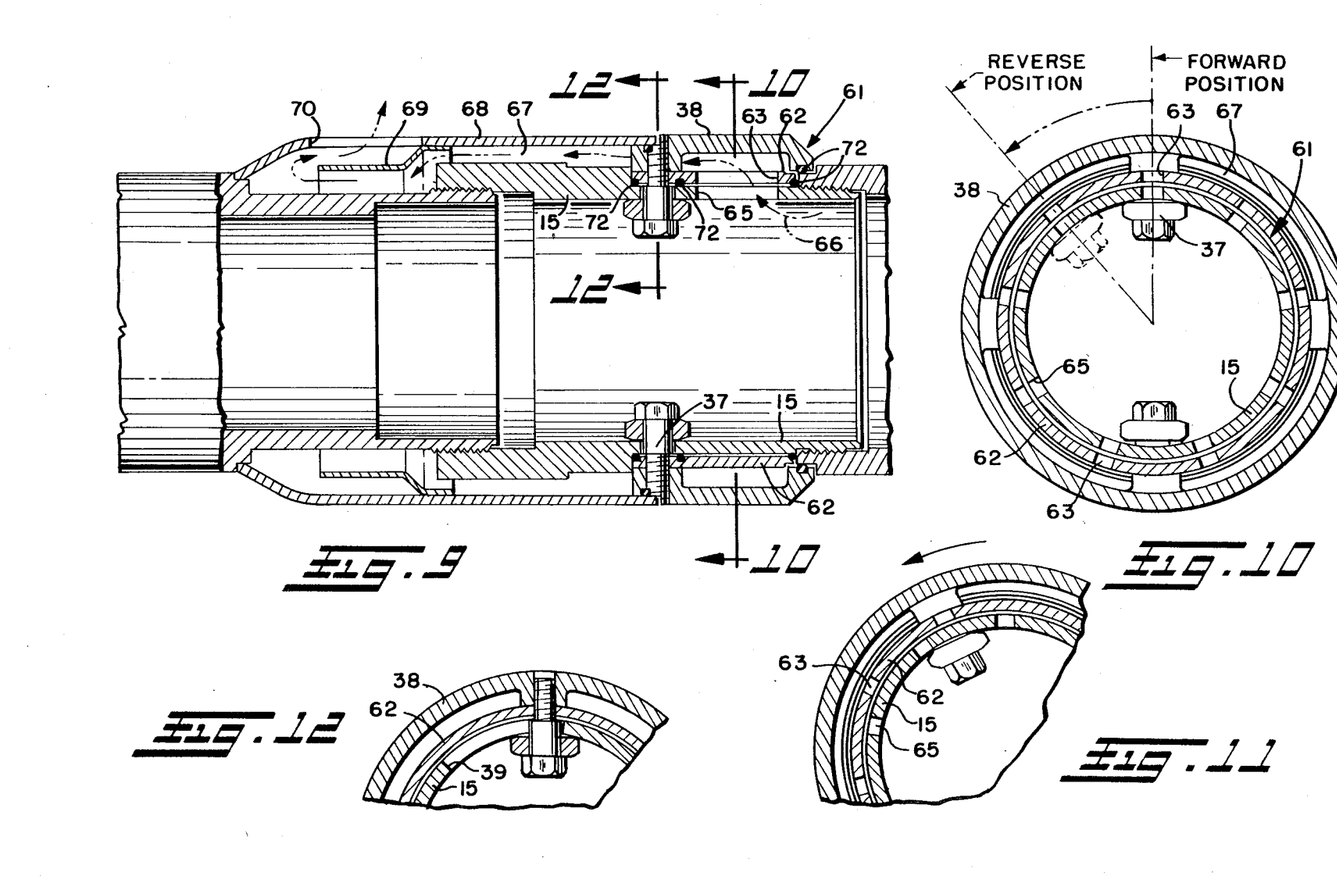
FIG. 9 is a partial vertical section of the gear housing (with the gear reversal mechanism not being shown for clarity of illustration) showing the shut-off interlock embodiment and shift collar in forward operating positions permitting motor exhaust air to leave the gear housing.
FIG. 10 is an end vertical section taken along the plane 10—10 in FIG. 9 showing the forward operating position in full lines and the reverse operating position in phantom lines.
FIG. 11 is a partial and section similar to FIG. 10 but showing the shift and shut off collars in neutral positions or modes in which the housing ports are blocked or sealed to preclude the exhaust air from leaving the gear housing, thereby to render the tool inoperative.
FIG. 12 is a partial end section taken along the plane 12—12 in FIG. 9 showing one of the elongated housing slots in which the cam pins move to permit the shift collar to be turned relative to the gear housing between its forward and reverse operating positions.

The gear housing 15 has circumferentially spaced exhaust ports 65 therethrough also in 40° circumferential intervals. When the shift collar 38 is rotated clockwise to its limit of movement to assume its forward operational position, as illustrated in FIG. 10, the ports 63 in shut-off collar 62 are in alignment and fluid communication with the exhaust ports 65 in gear housing 15. This communication allows the motor exhaust air to flow through the gear housing and out the aligned ports as indicated by the arrows 66 in FIG. 9. This exhaust air then passes through the annular chamber 67 defined between exhaust shield 68 and the tool housing. A baffle 69 may be mounted on the exhaust shield 68 to extend into the air chamber 67 to increase air travel distance and decrease the velocity of the air leaving exhaust holes 70 in the exhaust shield. With the shift interlock, exhaust air flows through the indicated ports, and the ports 58, as shown in FIG. 2, have been eliminated.

To shift the tool into reverse mode, the operator must overcome the frictional resistance of the four O rings 72 rotatably mounting the shift collar and shut off collar to the gear housing 15. This O ring friction tends to hold the shift collar in the operational position selected and provides natural resistance to turning.

When the operator begins to move the shift collar and the shut off collar coupled thereto in counterclockwise direction, the shut off collar ports 63 totally lose their alignment with the fixed housing exhaust ports 65 within 5° of collar rotation. As such, the housing exhaust ports 65 are quickly blocked or sealed by the cylindrical wall of the shut-off collar 62 between the ports therein. With the exhaust ports 65 sealed as illustrated in FIG. 11, the exhaust air cannot escape the gear housing 15 and thus the air motor is either automatically shut-off or cannot be started. The housing exhaust ports remain blocked or sealed during the shift collar transition from the forward mode to the reverse mode to preclude tool operation during shift collar rotation through the neutral zone between forward and reverse modes.

When the shift collar reaches the reverse position indicated in phantom in FIG. 10, which is achieved when the shank of cam member 37 abuts the left end of slot 39, the shut off collar ports 63 are again in alignment and registry with exhaust ports 65 in housing 15. With such registry, the motor and tool can be operated and the motor exhaust air exits the tool through housing 15, aligned ports 63, 65, chamber 67 and exhaust holes 70.

Although the operation of the reversible air tool of the present invention is believed apparent from the description set forth above, a brief description of the tool operation is hereinafter included for purposes of completeness beginning with the tool in its forward drive mode as shown in FIGS. 2, 4 and 10. The operator squeezes trigger 7 to initiate tool operation and the output shaft is driven in a clockwise direction by the splined bore of the primary drive gear directly coupling the input and output shafts. During tool operation, the diaphragm 55 expands under exhaust air pressure to radially advance the pin 51 into aligned aperture 59 in shift collar 38 to lock the same to the gear housing automatically to preclude reversal of the tool during operation. In addition to or instead of the diaphragm lock, the O-ring friction on the shut-off interlock 61 tends to hold the shift collar 38 in its operational position. When trigger 7 is released, air pressure in gear casing 15 decreases resulting in diaphragm 55 returning to its normal position to remove pin 51 from aperture 59 to unlock collar 38 for subsequent position selection.

If reversal is desired, the shift collar 38 can be rotated in a counterclockwise direction resulting in primary drive gear being cammed to its second axial position, as shown in FIG. 3. During the transition between positions, shut-off interlock 61 blocks the motor exhaust ports to preclude tool operation. When the reverse position is obtained, the operator then squeezes trigger 7 to actuate the air motor and shift collar lock, with the output being driven in a reverse or counterclockwise direction by input pinion 19, idler gears 21, transfer gears 23 and primary drive gear 28. At the completion of reverse operation, the unlocked shift collar may be rotated clockwise to return the primary drive gear to its first position under spring bias to reorient the tool for its forward drive mode.

It will be apparent from the foregoing that changes may be made in the details of construction and configuration without departing from the spirit of the invention as defined in the following claims. For example, the gear reversing mechanism could be actuated automatically by conventional solenoids or air cylinders rather than manually as described. As another example of a modification according to the invention, the pressurized air expanding the locking diaphragm could be from an input source rather than the exhaust source described.

I claim:

1. A gear reversal mechanism for a hand held power tool or the like, comprising a housing, a motor in said housing having a rotor pinion rotating in one direction upon motor actuation, idler gear means in mesh with and driven by said rotor pinion, transfer gear means in mesh with and driven by said idler gear means, a primary drive gear having a splined bore therein, an output drive shaft having output splines thereon, and cam means selectively to shift the primary drive gear between two alternate positions, said cam means including a shift body having ramp means thereon and the primary drive gear rotatably mounted therein for axial movement therewith, the first primary drive gear position coupling the rotor pinion to the output splines by the splined bore of the drive gear being in mesh with both to directly drive the output drive shaft in the forward rotation mode and the second alternative drive gear position coupling the rotor pinion to the output splines via the idler gear means, transfer gear means, primary drive gear and splined bore thereof to drive the output drive shaft in a reverse rotation mode.

2. The gear reversal mechanism of claim 1 wherein the shift body is rotationally fixed but selectively axially slidable to shift the primary drive gear mounted therein between its two alternate positions.

3. The gear reversal mechanism of claim 2 wherein the cam means further includes a shift collar rotatably mounted on said housing, said shift collar having cams thereon extending into said housing into sliding camming engagement with said ramp means.

4. The gear reversal mechanism of claim 3 wherein the cam means further include spring means biasing said shift body to retain said ramp means in engagement with said cams.

5. The gear reversal mechanism of claim 4 wherein rotation of said shift collar in one direction rotates said cams along said ramp means to positively cam said shift body from a first axial position to a second axial position respectively corresponding to the first and second axial positions of said primary drive gear.

6. The gear reversal mechanism of claim 5 wherein rotation of said shift collar in the opposite direction rotates said cams in the opposite direction and the ramp means follow said cams under the bias of said spring means, whereby said shift body returns to its said first axial position under the bias of said spring means and under the control of said cams.

7. The gear reversal mechanism of claim 6 further comprising means to lock the shift collar to the housing during motor operation positively to retain the shift body and primary drive gear in the selected axial position during such motor operation.

8. The gear reversal mechanism of claim 7 wherein the means to lock includes an extendible and retractable pin mounted to either said housing or said shift collar, and two spaced retention means selectively cooperating with said pin and being provided on the housing or shift collar opposed to said pin, said retention means being positioned to alternately be in alignment with said pin when the shift collar has been rotated to shift the primary gear to one of its two alternate positions.

9. The gear reversal mechanism of claim 8 wherein the means to lock further includes a diaphragm mounted to the housing with said pin being carried by and projecting outwardly from said diaphragm, with said diaphragm being deflected outwardly by pressurized air during motor operation selectively to insert the pin in the retention means aligned therewith temporarily to lock the shift collar to the housing.

10. The gear reversal mechanism of claim 9 wherein the flow of pressurized air is discontinued when the motor operation is terminated allowing the diaphragm to return inwardly to withdraw the pin from the retention means aligned therewith, thereby to unlock the shift collar to free the same for selective rotation relative to the housing.

11. The gear reversal mechanism of claim 10 further comprising means to direct pressurized exhaust air from the motor past the various gear means and against the diaphragm, thereby to have a lubricating effect on the various gear means, to muffle motor noise by extending the pressurized air exhaust path and selectively to actuate the locking means diaphragm.

12. The gear reversal mechanism of claim 3 further comprising a shut-off interlock means adapted to permit tool operation only when the shift collar is in a forward operating position or a reverse operating position.

13. The gear reversal mechanism of claim 12 wherein said shut off interlock means includes a shut off collar coupled to said shift collar, whereby said shift collar and shut off collar may selectively be simultaneously rotated relative to said housing.

14. The gear reversal mechanism of claim 13 wherein the shut-off interlock means further includes circumferentially spaced ports in the rotatable shut-off collar and equally circumferentially spaced ports in the housing.

15. The gear reversal mechanism of claim 14 wherein the shut-off collar ports and housing ports are in alignment in either the forward or reverse position of the shift collar to permit tool operation in the selected mode with exhaust air passing through the aligned ports to exit the tool.

16. The gear reversal mechanism of claim 15 wherein the shut-off collar ports and exhaust ports are out of alignment when the shift collar is in transition between its forward and reverse positions and the shut off collar closes the housing ports, whereby motor exhaust air is blocked and cannot escape the tool to preclude its operation.

17. A reversible air tool comprising a housing, a unidirectional air motor in said housing having a rotor pinion rotating in a single forward direction, drive means selectively actuated to directly couple the rotor pinion to an output drive shaft to directly drive said output drive shaft in said forward direction, gear means selectively actuated to indirectly couple the rotor pinion to the output drive shaft indirectly to drive said output drive shaft in a reverse direction, direction selection means alternately to engage either said drive means or said gear means selectively to change the rotation direction of the output drive shaft, and means to exhaust pressurized air from said motor past said drive means and gear means to have a lubricating effect on the same and to muffle motor noise by increasing the exhaust air flow path.

18. The reversible air tool of claim 17 further comprising shut off interlock means coupled to said direction selection means adapted to block motor exhaust air when the direction selection means are between forward and reverse operating modes to preclude tool operation between such modes.

19. The reversible air tool of claim 17 further comprising means temporarily to lock said direction selection means when said motor is actuated to preclude reversal during tool operation, said means to lock utilizing said pressurized exhaust air to positively retain the lock during motor actuation.

20. The reversible air tool of claim 19 wherein the drive means includes a primary drive gear having a splined bore therein selectively directly to couple the rotor pinion to the output drive shaft.

21. The reversible air tool of claim 20 wherein the gear means includes idler gears driven by said rotor pinion and transfer gears driven by said idler gears.

22. The reversible air tool of claim 21 further comprising cam means operated by said direction selection means axially to shift the primary drive gear selectively to remove the splined bore from engagement with the rotor pinion and to engage the drive gear with the transfer gear thereby to drive the output shaft in reverse direction through the idler gears, transfer gears, primary drive gear and splined bore.

* * * * *